(12) United States Patent
Tin

(10) Patent No.: US 7,085,414 B2
(45) Date of Patent: Aug. 1, 2006

(54) CHARACTERIZATION OF DISPLAY DEVICES BY AVERAGING CHROMATICITY VALUES

(75) Inventor: Siu-Kei Tin, Milpitas, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 18 days.

(21) Appl. No.: 10/840,345

(22) Filed: May 5, 2004

(65) Prior Publication Data

US 2005/0249402 A1    Nov. 10, 2005

(51) Int. Cl.
G06K 9/00 (2006.01)
G09G 5/02 (2006.01)
G03F 3/08 (2006.01)

(52) U.S. Cl. ........................ 382/167; 345/604; 358/518

(58) Field of Classification Search ................ 382/167; 345/604
See application file for complete search history.

(56) References Cited

U.S. PATENT DOCUMENTS

| | | | | |
|---|---|---|---|---|
| 4,985,853 A * | 1/1991 | Taylor et al. | ................ | 345/604 |
| 5,243,414 A * | 9/1993 | Dalrymple et al. | .......... | 358/500 |
| 5,416,890 A * | 5/1995 | Beretta | ........................ | 345/590 |
| 5,467,412 A * | 11/1995 | Capitant et al. | ............. | 382/167 |
| 5,561,459 A * | 10/1996 | Stokes et al. | ................ | 348/180 |
| 5,608,548 A * | 3/1997 | Sobol | .......................... | 358/522 |
| 5,909,291 A | 6/1999 | Myers et al. | ................ | 358/523 |
| 5,963,201 A * | 10/1999 | McGreggor et al. | ........ | 715/722 |
| 6,088,038 A | 7/2000 | Edge et al. | ................... | 345/431 |
| 6,108,442 A * | 8/2000 | Edge et al. | ................... | 382/167 |
| 6,362,808 B1 | 3/2002 | Edge et al. | ................... | 345/153 |
| 6,608,925 B1 | 8/2003 | Edge et al. | ................... | 382/162 |
| 6,856,429 B1 * | 2/2005 | Noguchi et al. | ............. | 358/1.9 |
| 2002/0031256 A1 * | 3/2002 | Hiramatsu et al. | .......... | 382/162 |
| 2003/0072016 A1 * | 4/2003 | Dalrymple et al. | .......... | 358/1.9 |
| 2003/0164927 A1 * | 9/2003 | Tsukada | ....................... | 353/31 |
| 2004/0196250 A1 * | 10/2004 | Mehrotra et al. | ........... | 345/102 |

FOREIGN PATENT DOCUMENTS

EP          1 155          2/2003
JP      08201939 A  *  8/1996

(Continued)

OTHER PUBLICATIONS

Fairchild M. and Wyble D., "Colormetric Characterization of the Apple Studio Displau (Flat Panel LCD)", Mussel Color Science Laboratory Technical Report, Jul. 1998, http://www.cis.rit.edu/mcsl/research/reports.php.*

(Continued)

*Primary Examiner*—Bhavesh M. Mehta
*Assistant Examiner*—Utpal Shah
(74) *Attorney, Agent, or Firm*—Fitzpatrick, Cella, Harper & Scinto

(57) ABSTRACT

The present invention provides a method for characterizing display devices. Initially, a plurality of colors are generated on the display device. The generated colors are measured and a black point and a white point are determined. The measured colors are then corrected for the determined black point in order to obtain a plurality of chromaticity values. The chromaticity values of the corrected color values are averaged, and a tristimulus matrix is generated with the averaged chromaticity values and the determined white point. By averaging the chromaticity values of black-point-corrected measurements, the present invention is able to create more accurate display device characterizations that account for the effects of flare. In addition, by averaging the chromaticity values of black-point-corrected measurements, the present invention minimizes the effects of inaccurate color measurements made during the device characterization process.

14 Claims, 4 Drawing Sheets

FOREIGN PATENT DOCUMENTS

| JP | 2000261685 A | * | 9/2000 |
| --- | --- | --- | --- |
| JP | 2005136854 A | * | 5/2005 |

OTHER PUBLICATIONS

Berns R., Fernandez S. and Taplin L., "Estimating Black-Level Emissions of Computer Controlled Displays", Color Research and Application, vol. 28, Issue 5, Aug. 2003, pp. 379-383.*

Fairchild, Mark D. and Wyble, David R., "Colorimetric Characterization of the Apple Studio Display (Flat Panel LCD)" Munsell Color Science Laboratory Technical Report (Jul. 1998), available at http://www.cis.rit.edu/mcsl/PDFs/LCD.pdf.

Berns, R.S., Billmeyer and Saltzman's Principles of Color Technology, 3rd Ed., John Wiley & Sons (2000).

Berns, R.S. and Katoh, N., "The Digital to Radiometric Transfer Function for Computer Controlled CRT Displays", CIE Expert Symposium '97 Colour Standards for Imaging Technology, Nov. 1997.

Berns, R.S., Fernandez, Scot, and Taplin, Lawrence, "Estimating Black-Level Emissions of Computer-Controlled Displays", Color Research and Application, 28: 379-383, Wiley Periodicals, Inc. (2003).

Kang, Henry R., Color Technology for Electronic Imaging Devices, SPIE (1997).

Katoh, N., Deguchi, T., and Berns, R.S., "An Accurate Characterization of CRT Monitor (II) Proposal for an Extension to CIE Method and its Verification", Optical Review 8, 397-408 (2001)

* cited by examiner

CHARACTERIZATION OF DISPLAY DEVICES BY AVERAGING CHROMATICITY VALUES

BACKGROUND OF THE INVENTION

1. Field of the Invention

The present invention relates to the generation of color models which characterize display devices.

2. Description of the Related Art

Typically, display devices, such as liquid crystal displays (LCD) or cathode-ray tubes (CRT), produce colors on a screen by combining different amounts of red, blue and green light. The actual color produced from specific combinations of RGB light varies from display device to display device. Therefore, in order to consistently reproduce colors on different displays, manufacturers of display devices create color models that characterize the output of a particular display device in terms of a standard color coordinate system. For instance, Commission Internationale de l'Enclairage (CIE) XYZ color coordinates are often used.

Conventionally, a display device characterization is represented by the following equation:

$$\begin{bmatrix} X \\ Y \\ Z \end{bmatrix} = [M] \cdot \begin{bmatrix} R' \\ G' \\ B' \end{bmatrix}$$

R'G'B' are radiometric scalar values that are related to device RGB values according to generally non-linear relationships commonly called "gamma curves." The matrix M is a 3×3 tristimulus matrix which relates the linear R'G'B' values to XYZ values.

Conventionally, the tristimulus matrix M is populated according to the following equation:

$$M = \begin{bmatrix} X_{r,max} & X_{g,max} & X_{b,max} \\ Y_{r,max} & Y_{g,max} & Y_{b,max} \\ Z_{r,max} & Z_{g,max} & Z_{b,max} \end{bmatrix}$$

Each X, Y, and Z value in matrix M corresponds to a measured XYZ value when the maximum R, G and B values are applied to the device. Once determined, the tristimulus matrix M maps any linearized R'G'B' value used by the display device to the actual XYZ color that the display device is expected to reproduce.

This conventional model for characterizing display devices is built upon the assumption that the measurements are done in a dim environment where ambient lighting has little effect on the measurements. This assumption may not always prove true. For example, many display devices will produce a non-zero amount of light when displaying the color black. This black point measurement is often called flare. In addition, a non-zero flare value can be caused by higher than optimal ambient lighting. In either case, the flare skews the results of the measurements.

Attempts to measure or estimate flare, and correct for its effect, are well-known in the art. However, these attempts have generally been unsatisfactory. For instance, the effect of flare has been built into a general gain-offset-gamma-offset (GOGO) model for gamma curves. This model attempts to correct for the effects of flare in gamma curves. However, the effect of this model is limited since each gamma curve can only act on each channel independently. Other efforts have been made to correct for flare in the tristimulus matrix, but these efforts still utilize the conventional formula for populating the matrix.

As such, the conventional method does not fully address problems associated with flare, since only measurements at maximum RGB values are used to populate the tristimulus matrix. Even if flare is accounted for, the measurements themselves may be inaccurate, and therefore, the resulting tristimulus matrix may not provide the most accurate device characterization.

SUMMARY OF THE INVENTION

The present invention addresses the foregoing problems by obtaining values for a tristimulus matrix by averaging the chromaticities of measured values that have been corrected by the black point.

According to one aspect of the invention, a method for generating a color model that characterizes a display device includes the steps of obtaining measurement data of plural colors displayed on the display device, estimating a black point of the display device from the measurement data, and generating the color model that characterizes the display device based on the estimated black point and the measurement data.

According to another aspect of the invention, a plurality of colors are generated on the display device. The generated colors are measured and a black point and a white point are determined. The measured colors are then corrected for the determined black point in order to obtain a plurality of chromaticity values. The chromaticity values of the corrected color values are averaged, and a tristimulus matrix is generated with the averaged chromaticity values and the determined white point.

According to more preferred aspects of the invention, the plurality of colors are generated by the display device in accordance with a plurality of digital values in red, blue, green and neutral ramps.

According to another aspect of the invention, a plurality of gamma curves are created by inverting the tristimulus matrix and multiplying the inverted tristimulus matrix with the measured colors from the neutral ramp.

According to yet another aspect of the invention, the black point is determined by measuring the color produced at the neutral ramp value of R=G=B=0.

According to still another aspect of the invention, the black point is determined by estimating the black point from the plurality of measured colors using a non-linear optimization method.

By averaging the chromaticity values of black-point-corrected measurements, the present invention is able to create more accurate display device characterizations that account for the effects of flare. In addition, by averaging the chromaticity values of black-point-corrected measurements, the present invention minimizes the effects of inaccurate color measurements made during the device characterization process.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE INVENTION

Figure 1:
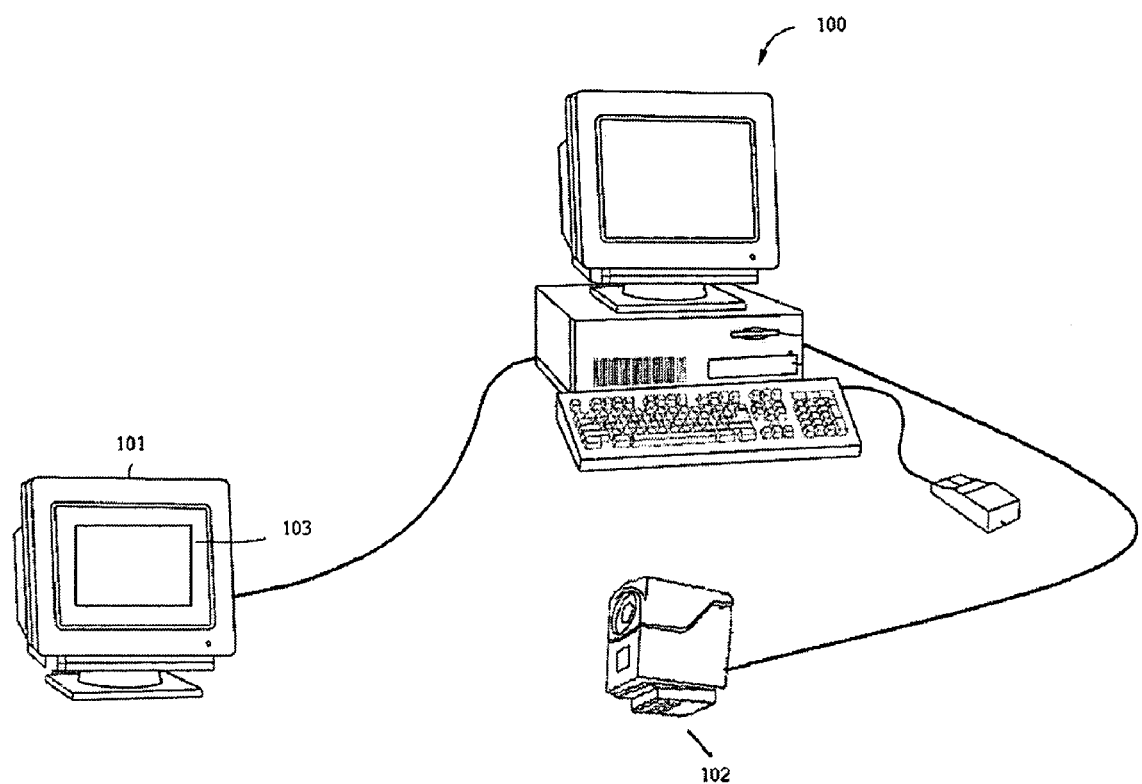
FIG. 1 is a representative view of the environment in which the present invention may be implemented according to one embodiment of the invention.

The present invention provides a method for generating a color model that characterizes display devices by utilizing averaged, black-point corrected, chromaticity values from measured RGB values to populate a tristimulus matrix. Typically, the present invention is implemented in a computing environment. A representative computing system may include computing equipment, peripherals and digital devices which may be used in connection with practicing the present invention. The computing equipment includes a host processor which comprises a personal computer (hereinafter "PC"), preferably an IBM PC-compatible computer having a windowing environment such as Microsoft Windows 98, Windows 2000, Windows Me, Windows XP, or Windows NT, or other windowing systems such as LINUX. In the alternative, the host processor may be an Apple computer or other non-windows based computers. The computing equipment also includes a color monitor, including a display screen, a keyboard for entering text data and user commands, and a pointing device. The pointing device preferably comprises a mouse for pointing and for manipulating objects displayed on the display screen.

The computing equipment also includes computer-readable memory media such as a computer fixed disk and a floppy disk drive. A floppy disk drive provides a means whereby the computing equipment can access information, such as color measurement data, computer-executable process steps, application programs, etc. stored on removable memory media. In the alternative, information can also be retrieved through other means such as a USB storage device connected to a USB port, or through a network interface. Also, a CD-ROM drive and/or a DVD drive may be included so that the computing equipment can access information stored on removable CD-ROM and DVD media.

The internal architecture of the host processor of the computing equipment includes a central processing unit (CPU) which interfaces with a computer bus. Also interfacing with computer bus are a fixed disk, a network interface, a random access memory (RAM) for use as a main run-time transient memory, a read only memory (ROM), a floppy disk interface, a display interface for the monitor, a keyboard interface for the keyboard, a mouse interface for the pointing device, and an interface for other peripheral digital devices, such as a colorimeter or a spectroradiometer.

The RAM interfaces with the computer bus so as to provide information stored in the RAM to the CPU during execution of software programs such as an operating system, application programs, such as a display device characterization program, and device drivers. More specifically, the CPU first loads computer-executable process steps from the fixed disk, or another storage device, into a region of the RAM. The CPU can then execute the stored process steps from the RAM in order to execute the loaded computer-executable process steps. Data such as color measurements or other information can be stored in the RAM, so that the data can be accessed by CPU during the execution of computer-executable process steps need to access and/or modify the data.

The fixed disk contains the operating system, and application programs, such as a display device characterization program. The display device characterization method of the present invention is preferably performed, in part, by computer-executable process steps which are stored on the fixed disk for execution by the CPU, such as in one of the application programs. The process steps for characterizing a display of the present invention are described in more detail below.

FIG. 1 depicts a representative environment in which the invention is practiced. In order to characterize the output of an RGB display device, many different RGB colors must be displayed on a display device and measured. As shown in FIG. 1, computing equipment 100 is used to supply RGB values to display device 101. Computing equipment 100 controls display device 101 to display a supplied RGB value as color patch 103. Color measuring device 102 is used to measure the color of color patch 103. Color measuring device 102 can be a spectroradiometer or a colorimeter, or any other color measuring device that is capable of measuring colors and outputting the measurements in the CIEXYZ format.

Computing equipment 100 controls display device 101 to display colors in red, blue, green and neutral ramps on color patch 103. For example, in the preferred embodiment, the red ramp consists of 17 R values ranging from digital values of 15 to 255 in steps of 15. While using 17 values in the ramp is preferred, more or less values of R could be used. The G and B values are held at zero for each R value in the red ramp. The green and blue ramps are constructed in the same manner as the red ramp.

Figure 2:
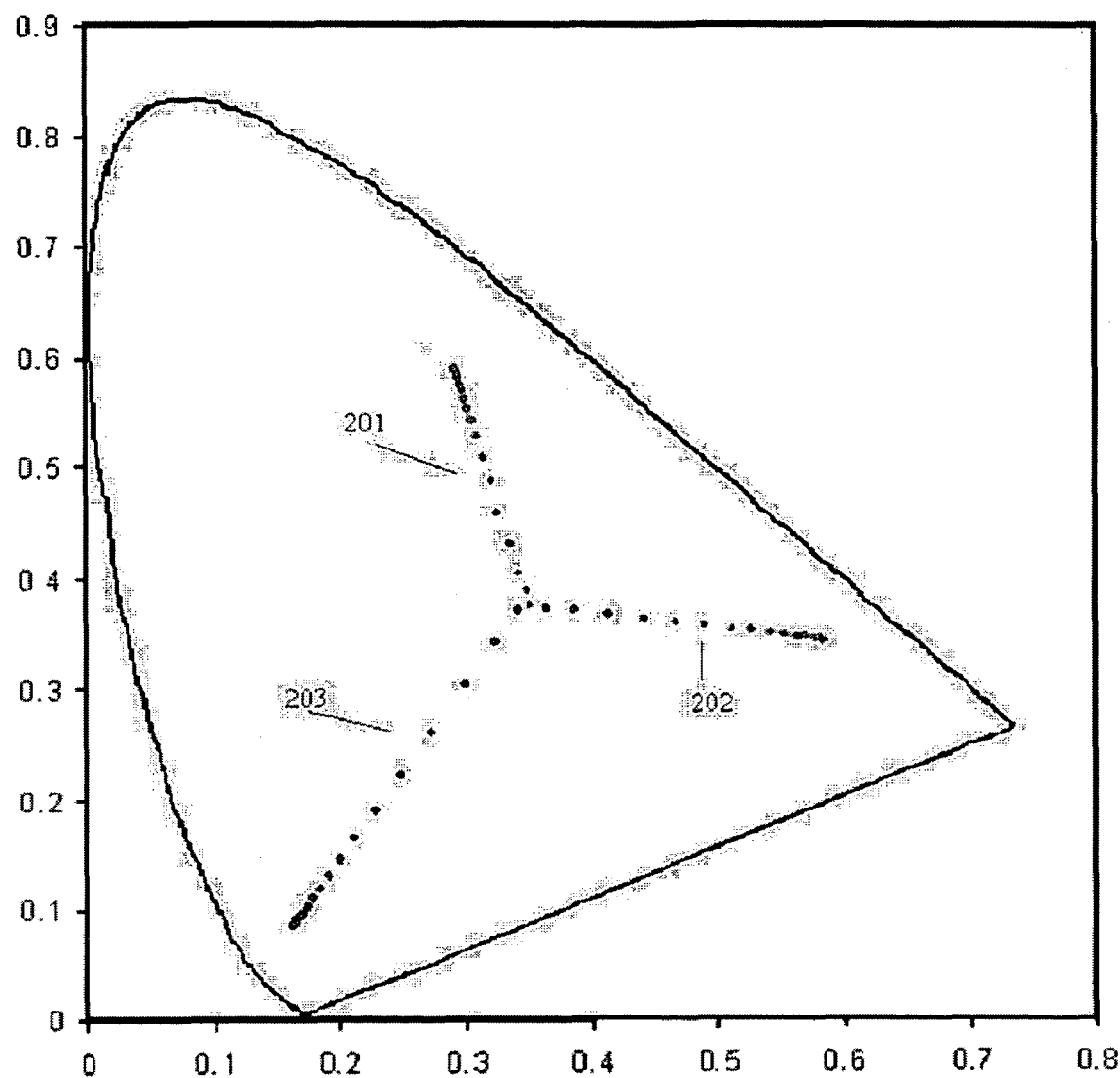
FIG. 2 is a graph depicting the measured values of the R, G and B ramps in the x-y chromaticity plane.

Color measuring device 102 takes a measurement of color patch 103 for each value in each ramp, and supplies the measurements to computing equipment 100. For example, color measuring device 102 can be connected to computing equipment 100 via a USB cable or another device interface. FIG. 2 depicts a graph showing representative measured values of the red, green, and blue ramps on the chromaticity x-y plane. Dotted line 201 represents the measured chromaticities of the green ramp, dotted line 202 represents the measured chromaticities of the red ramp, and dotted line 203 represents the measured chromaticities of the blue ramp. The chromaticities of each ramp converge as the digital values of each R, G, and B ramp approaches zero.

In addition to displaying and measuring colors along each red, blue and green color ramp, the present invention also displays and measures colors along a neutral ramp. The neutral ramp contains digital values where R=G=B. For a cathode-ray tube (CRT) display device, the neutral ramp is preferably measured at digital values of R=G=B=0, 8, 16, 32, 64, 128, 192 and 255. For a liquid crystal display (LCD) device, the neutral ramp is preferably measured at digital values of R=G=B ranging from 0 to 255 in steps of 15. In either case, the digital value of R=G=B=0 causes the color black to be displayed on color patch 103, and R=G=B=255 causes the color white to be displayed on color patch 103.

Color measuring device 102 takes a measurement of color patch 103 for each value in the neutral ramp, and supplies the measurements to computing equipment 100. The measurement of the color black is often referred to as the "black point" of the display device, and likewise, the measurement of the color white is referred to as the "white point" of the display device.

Once all the measurement have been taken and supplied to computing equipment 101, a characterization for display device 102 can be computed. A display device characterization is typically represented by the following model:

$$\begin{bmatrix} X \\ Y \\ Z \end{bmatrix} = [M] \cdot \begin{bmatrix} R' \\ G' \\ B' \end{bmatrix}$$

R'G'B' are radiometric scalar values that are related to device RGB values according to generally non-linear relationships commonly called "gamma curves." The matrix M is a 3×3 tristimulus matrix which relates the linear R'G'B' values to XYZ values. This model can be utilized by a color management module (CMM) contained in a device driver or computer operating system to convert device-independent XYZ color values into the RGB values used by the characterized display device.

Figure 3:
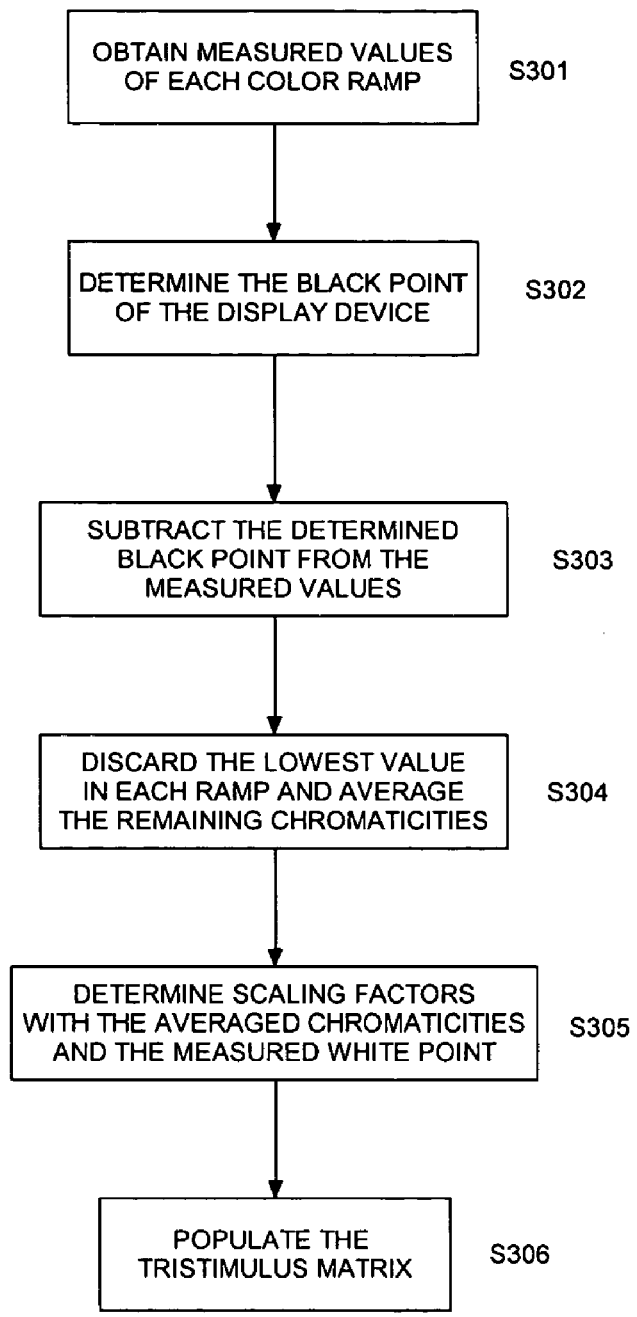
FIG. 3 is a flow chart for explaining the process to create a display device characterization color model according to one embodiment of the present invention.

FIG. 3 depicts a flow chart that shows how the present invention populates the tristimulus matrix M. Initially, in step S301, computing equipment 100 obtains the measured values of each value in each color ramp from the color measuring device 102. In step S302, the black point of display device 101 is determined. It is necessary to determine the black point (also known as flare) so that its effects may be corrected from the other measured data points. Ideally, when a display device displays the color black, the measured output of the display device should read (0,0,0) in XYZ. However, many display devices will produce a non-zero amount of light when displaying the color black. In addition, a non-zero black point may be due to higher than optimal ambient lighting when the color measurement is taken. In either case, the flare skews the results of the measurements.

The black point can be determined in multiple ways. First, the black point can simply be measured from the display device. As stated above, the neutral ramp value of R=G=B=0 produces the color black, and its measured value is the black point. However, since color measuring devices are typically inaccurate at low light levels, using the directly measured black point of a display device is not typically an accurate method determining the black point.

Instead, it is preferable to obtain the black point of the display device by estimating its value from more accurate color measurements. The estimation process involves solving a nonlinear optimization problem to find the "best fit" black point that minimizes the drift in chromaticity along the R, G, and B channels. The nonlinear optimization problem solves for the black point $(X_K, Y_K, Z_Y)$ that minimizes the following objective function:

$$\Phi(X_K, Y_K, Z_K) = \psi(X_K, Y_K, Z_K; S_R) + \psi(X_K, Y_K, Z_K; S_G) + \psi(X_K, Y_K, Z_K; S_B)$$

$S_R$, $S_G$, and $S_B$ are the set of data points corresponding to the measured values of the R, G, and B ramps described above. For any set of S, the function $\Psi$ is defined as follows.

$$\Psi(X_K, Y_K, Z_K; S) = \sum_{i \in S} \|f(X_i, Y_i; X_K, Y_K, Z_K) - \bar{f}(X_K, Y_K, Z_K; S)\|^2$$

-continued
$$f(X, Y, Z; X_K, Y_K, Z_K) = \left( \frac{X - X_K}{X - X_K + Y - Y_K + Z - Z_K}, \frac{Y - Y_K}{X - X_K + Y - Y_K + Z - Z_K} \right)$$

$$\bar{f}(X_K, Y_K, Z_K; S) = \frac{1}{|S|} \sum_{i \in S} f(X_i, Y_i, Z_i; X_K, Y_K, Z_K)$$

In the above equations, |S| is the cardinality of S, i.e., the number of points in the set S. The function f gives the chromaticity coordinates of the point $(X-X_K, Y-Y_K, Z-Z_K)$, and the function $f_{bar}$ gives the average, or center of mass, of all the points in the set S in the chromaticity plane. Thus, the function $\Psi$ gives the sum of second moments of the points about the center of mass, and is a measure of how spread out the points are about the center of mass. The function $\Phi$ is a total measure of how spread out the three clusters of points from the measured RGB color ramps are about their respective centers of mass.

Just as the direct measurement of the: black point is often inaccurate due to the insensitivity of color measuring devices at low light levels, the lowest color values in each color ramp are also often difficult to measure. Thus, in the preferred embodiment, the first point in each ramp (digital value 15) is discarded because it is typically inaccurate, and the cardinality of S is adjusted down accordingly. In addition, in the calculation of $f(X,Y,Z;X_K, Y_K,Z_K)$, if $X=X_K$, $Y=Y_K$, and $Z=Z_K$, the calculation is skipped and the cardinality of S is adjusted down accordingly.

In the preferred embodiment, the above-described objective function is a sum of squares of 96 differentiable functions in $X_K$, $Y_K$, $Z_K$ (16 points×2 xy-components×3 channels=96). Note that 16 points are used instead of the 17 that are measured in each ramp, since the lowest value is discarded. Since the objective function is a sum of squares of 96 differentiable functions, it is amenable to standard nonlinear least squares techniques such as the Levenberg-Marquardt algorithm.

As with any iterative algorithm for nonlinear least squares problems, the Levenberg-Marquardt algorithm requires an initial guess for $(X_K, Y_K, Z_K)$. There are two candidates for the first guess. One is (0, 0, 0) and the other is the actual measured black point of the display device. Preferably, the actual measured black point is first used as the initial guess. If a maximum of 100 iterations is exceeded without achieving a predetermined threshold value, then another round of iterations is performed with (0, 0, 0) as the initial guess. The threshold value is the average distance of each point from its center of mass, and in the preferred embodiment is set at 0.001. If the iteration using the measured black point as the initial guess achieves the threshold value, then the result is used as the estimated black point. If not, the result of the iteration using (0,0,0) as the initial guess is compared to the result of the iteration using the measured black point as the initial guess, and the iteration result that gives the smallest value for the object function $\Phi$ is used as the estimated black point.

Figure 4:
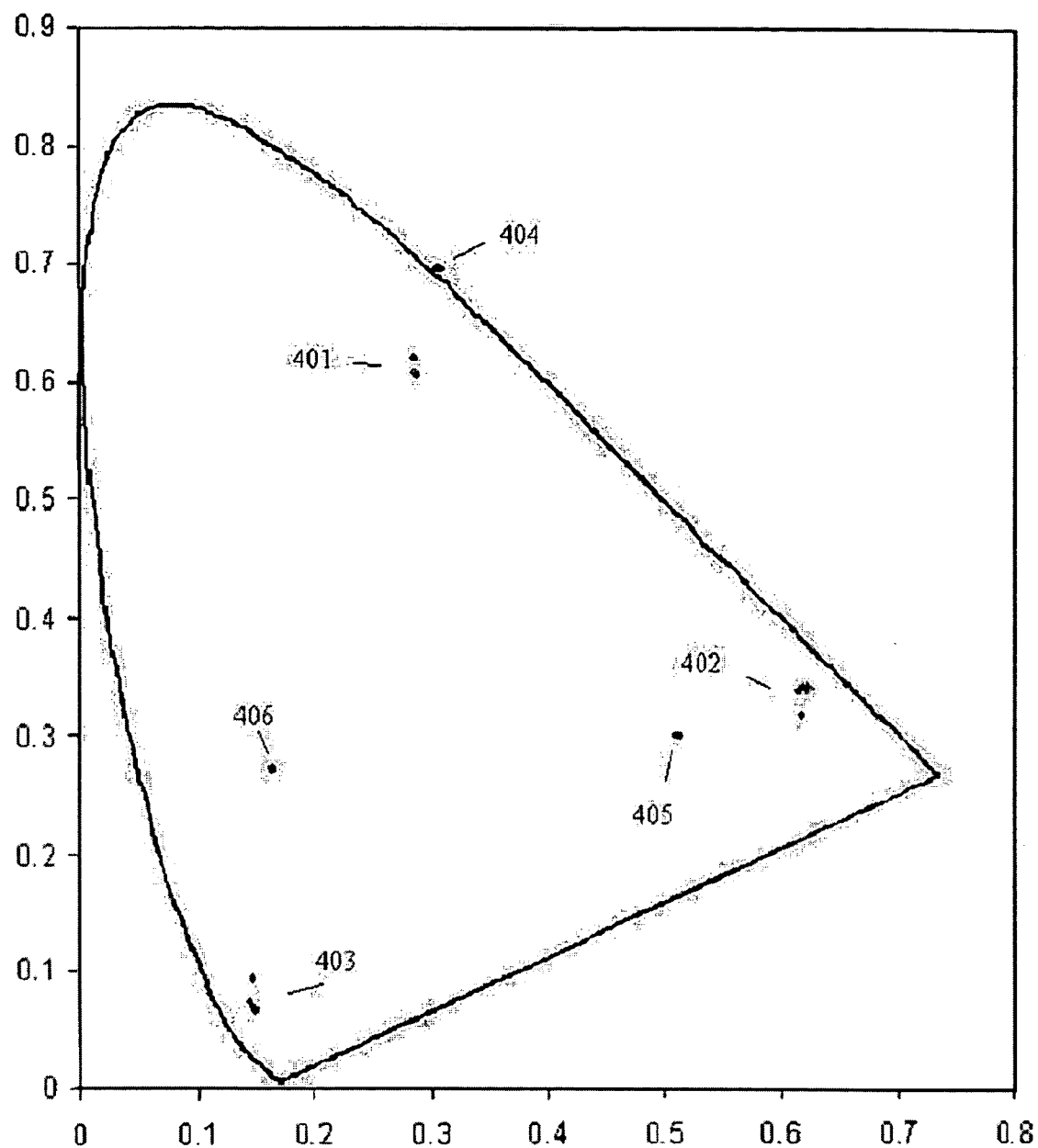
FIG. 4 is a graph depicting the measured values of the R, G and B ramps in the x-y chromaticity plane that have been corrected for the black-point.

Turning back to FIG. 3, once the black point is obtained is step S302, the black point is subtracted from the raw XYZ color ramp measurements in step S303. FIG. 4 depicts a graph showing black-point corrected measured values in the x-y chromaticity plane. Cluster 401 represents the black-point corrected chromaticities of the green ramp, cluster 402 represents the black-point corrected chromaticities chromaticities of the red ramp, and cluster 403 represents the black-point corrected chromaticities of the blue ramp. Points 404, 405 and 406 represent the black-pointed corrected chromaticities of lowest value (digital value of 15) of each color ramp. As can be seen in FIG. 4, points 404, 405 and 406 lie far outside their respective clusters. This is due to the inaccuracy of the color measuring device at low light levels.

Next, the tristimulus matrix M is populated. Instead of populating the matrix with X, Y, and Z values corresponding to measured XYZ values when the maximum RGB values are applied to the device, the present invention populates the tristimulus matrix with averaged, black-point corrected chromaticity values. In this way, the resulting tristimulus matrix not only accounts for effects of flare, but also provides a more robust characterization that is less susceptible to inaccurate color measurements.

Initially, in step S304, the black-point corrected chromaticity values associated with lowest value (digital value of 15) in each color ramp is discarded. For example, points 404, 405, and 406 in FIG. 4 would be discarded. In addition, if the black point was estimated, any other points in each color ramp that was not used to estimate the black point should not be used. Next, in step S304, the chromaticities for each measure color cluster are averaged. The averaged chromaticity points are represented as follows:

$(\bar{x}_r, \bar{y}_r), (\bar{x}_g, \bar{y}_g), (\bar{x}_b, \bar{y}_b)$

Next, in step S305, scaling values for the averaged chromaticities are calculated by solving the following equation for $t_r$, $t_g$, and $t_b$.

$$\begin{pmatrix} \bar{x}_r & \bar{x}_g & \bar{x}_b \\ \bar{y}_r & \bar{y}_g & \bar{y}_b \\ 1-\bar{x}_r-\bar{y}_r & 1-\bar{x}_g-\bar{y}_g & 1-\bar{x}_b-\bar{y}_b \end{pmatrix} \begin{pmatrix} t_r \\ t_g \\ t_b \end{pmatrix} = \begin{pmatrix} X_W \\ Y_W \\ Z_W \end{pmatrix}$$

$X_W$, $Y_W$, $Z_W$ is the measured white point of the display device. The tristimulus matrix M is then populated in step S306 according to the following equation.

$$\begin{pmatrix} t_r\bar{x}_r & t_g\bar{x}_g & t_b\bar{x}_b \\ t_r\bar{y}_r & t_g\bar{y}_g & t_b\bar{y}_b \\ t_r(1-\bar{x}_r-\bar{y}_r) & t_g(1-\bar{x}_g-\bar{y}_g) & t_b(1-\bar{x}_b-\bar{y}_b) \end{pmatrix}$$

Once the tristimulus matrix is populated, gamma curves can be determined using the standard approach. The inverse matrix of tristimulus matrix is applied to the measured XYZ data of the neutral ramp to obtain linear RGB data. Next, in the case of a CRT display, the linear RGB data is correlated with the digital RGB values using nonlinear regression on the gain-offset-gamma (GOG) model. In the case of an LCD display, the linear RGB data is correlated with the digital RGB values using direct linear interpolation.

The invention has been described above with respect to particular illustrative embodiments. It is understood that the invention is not limited to the above-described embodiments and that various changes and modifications may be made by those skilled in the relevant art without departing from the spirit and scope of the invention.

What is claimed is:

1. A method for generating a color model that characterizes a display device, the method comprising the steps of:
   obtaining measured color values for a plurality of colors displayed on the display device;
   determining a black point value and a white point value from the measured color values;
   correcting the measured color values with the determined black point value in order to obtain a plurality of black-corrected chromaticity values arranged in plural clusters;
   averaging the chromaticity values of the black-corrected chromaticity values separately for each cluster; and
   generating a tristimulus matrix with the averaged chromaticity values and the determined white point value.

2. The method according to claim 1, wherein the plurality of colors are generated by the display device in accordance with a plurality of digital values in a red, blue, green and neutral ramp.

3. The method according to claim 2, further comprising the step of:
   creating a plurality of gamma curves with the generated tristimulus matrix and the measured colors, wherein the determining step includes the steps of:
   inverting the tristimulus matrix, and
   multiplying the inverted tristimulus matrix with the measured color values from the neutral ramp.

4. The method according to claim 3, wherein the display device is a CRT display device, and wherein the red, blue, and green ramps contain the digital values of 15 to 255 in steps of 15, and the neutral ramp contains the digital values of 0, 8, 16, 32, 64, 128, 192 and 255.

5. The method according to claim 3, wherein the display device is a LCD device, and wherein the red, blue, and green ramps contain the digital values of 15 to 255 in steps of 15, and the neutral ramp contains the digital values of 0 to 255 in steps of 15.

6. The method according to claim 3, wherein the plurality of colors are measured in XYZ.

7. The method according to claim 1, wherein the black point is determined by measuring the color produced at the neutral ramp value of R=G=B=0.

8. The method according to claim 1, wherein the black point value is determined by estimating the black point value from the plurality of measured color values using a nonlinear optimization method.

9. The method according to claim 8, wherein the nonlinear optimization method is the Levenberg-Marquardt algorithm.

10. A color management module for converting device-independent color values to device-dependent color values, wherein the color management module utilizes a tristimulus matrix generated by the method according to any one of claims 1 to 9, to convert device-independent color values into RGB values used by the characterized display device.

11. An apparatus for generating a color model that characterizes a display device, the apparatus comprising:
   a program memory for storing process steps executable to perform a method according to any one of claims 1 to 9; and
   a processor for executing the process steps stored in said program memory.

12. Computer-executable process steps stored on a computer readable medium, said computer-executable process steps for generating a color model that characterizes a display device, said computer-executable process steps comprising process steps executable to perform a method according to any one of claims 1 to 9.

13. A computer-readable medium which stores computer-executable process steps, the computer-executable process steps for generating a color model that characterizes a display device, said computer-executable process steps comprising process steps executable to perform a method according to any one of claims 1 to 9.

14. A method for generating a color model that characterizes a display device, the method comprising the steps of:
  generating a plurality of colors on the display device;
  measuring the generated colors;
  determining a black point and a white point from the measured colors;
  correcting the measured color values with the obtained black point in order to obtain a plurality of chromaticity values;
  averaging the chromaticity values of the corrected color values;
  generating a tristimulus matrix with the averaged chromaticity values and the determined white point; and
  creating a plurality of gamma curves with the generated tristimulus matrix and the measured colors,
  wherein the determining step includes the steps of:
  inverting the tristimulus matrix; and
  multiplying the inverted tristimulus matrix with the measured colors from the neutral ramp, and
  wherein the averaging step discards the chromaticity value from the first corrected measured color value of each ramp.

* * * * *